May 9, 1950  E. M. KELLY  2,506,927
CLARIFICATION
Filed Feb. 16, 1946  3 Sheets-Sheet 2
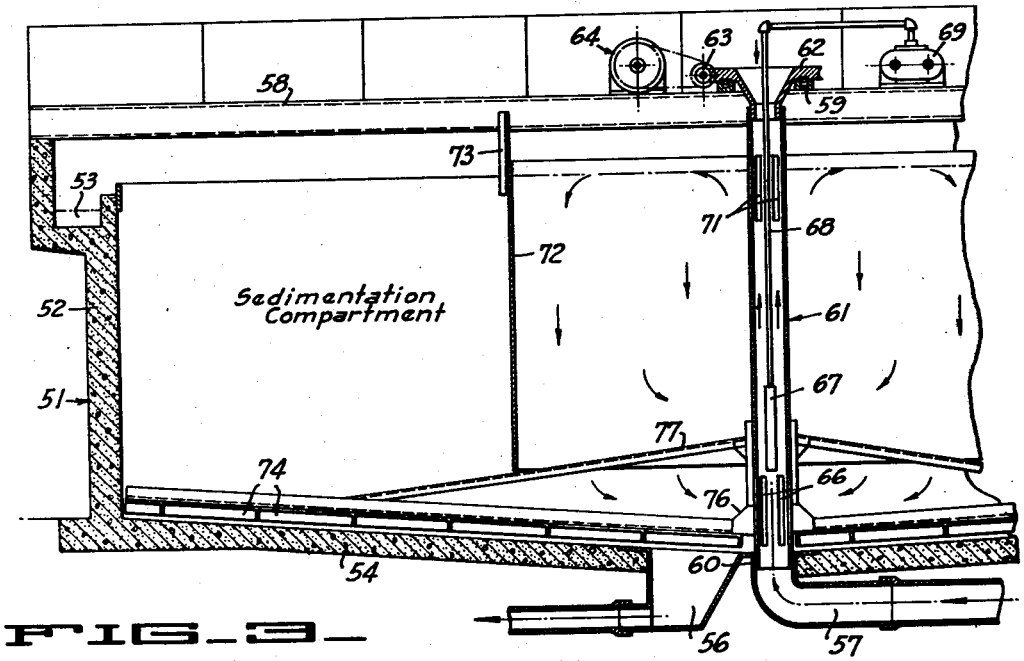
FIG_3_
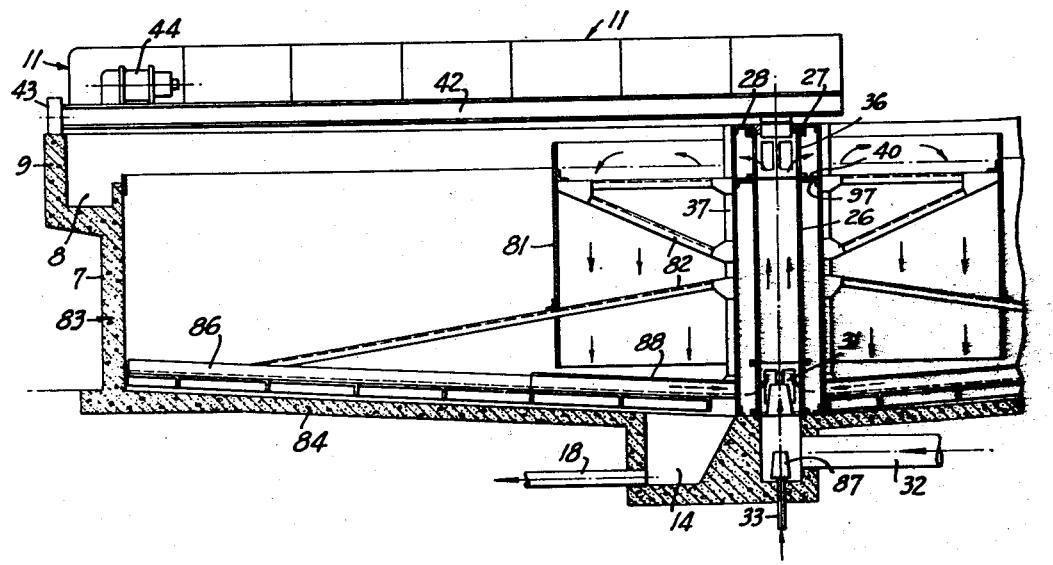
FIG_4_
INVENTOR.
Earl M. Kelly
BY
ATTORNEY May 9, 1950  E. M. KELLY  2,506,927
CLARIFICATION
Filed Feb. 16, 1946  3 Sheets-Sheet 3
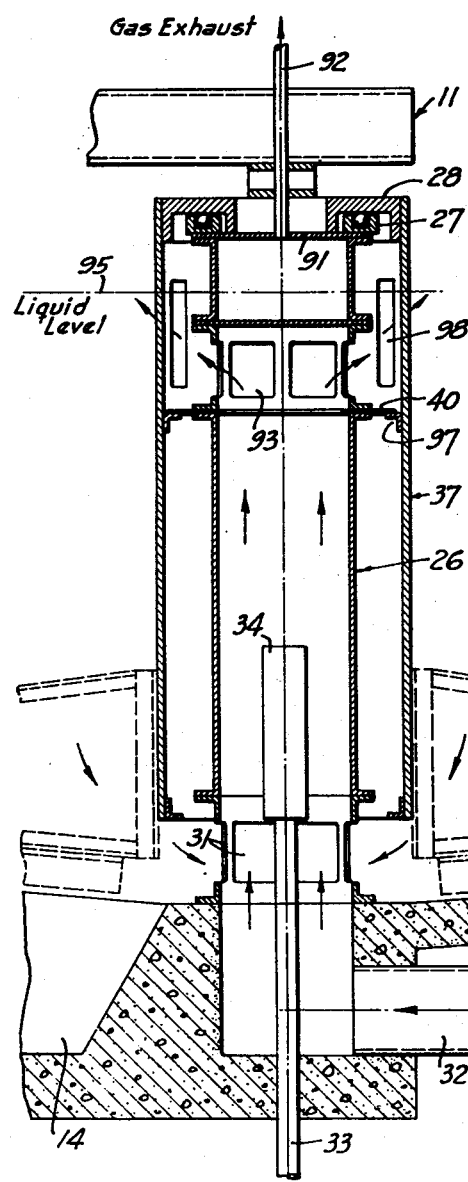
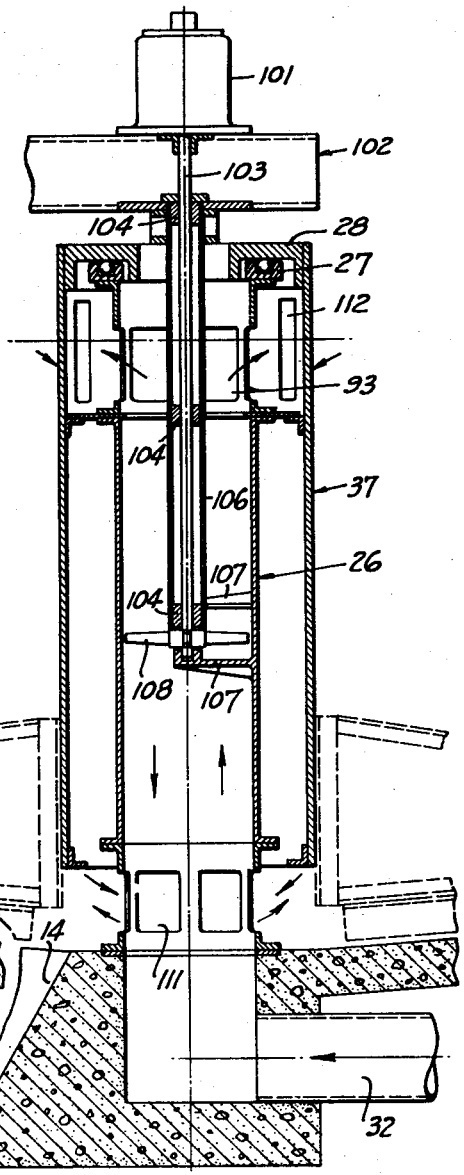
FIG_5_  FIG_6_
INVENTOR.
Earl M. Kelly
BY
ATTORNEY Patented May 9, 1950

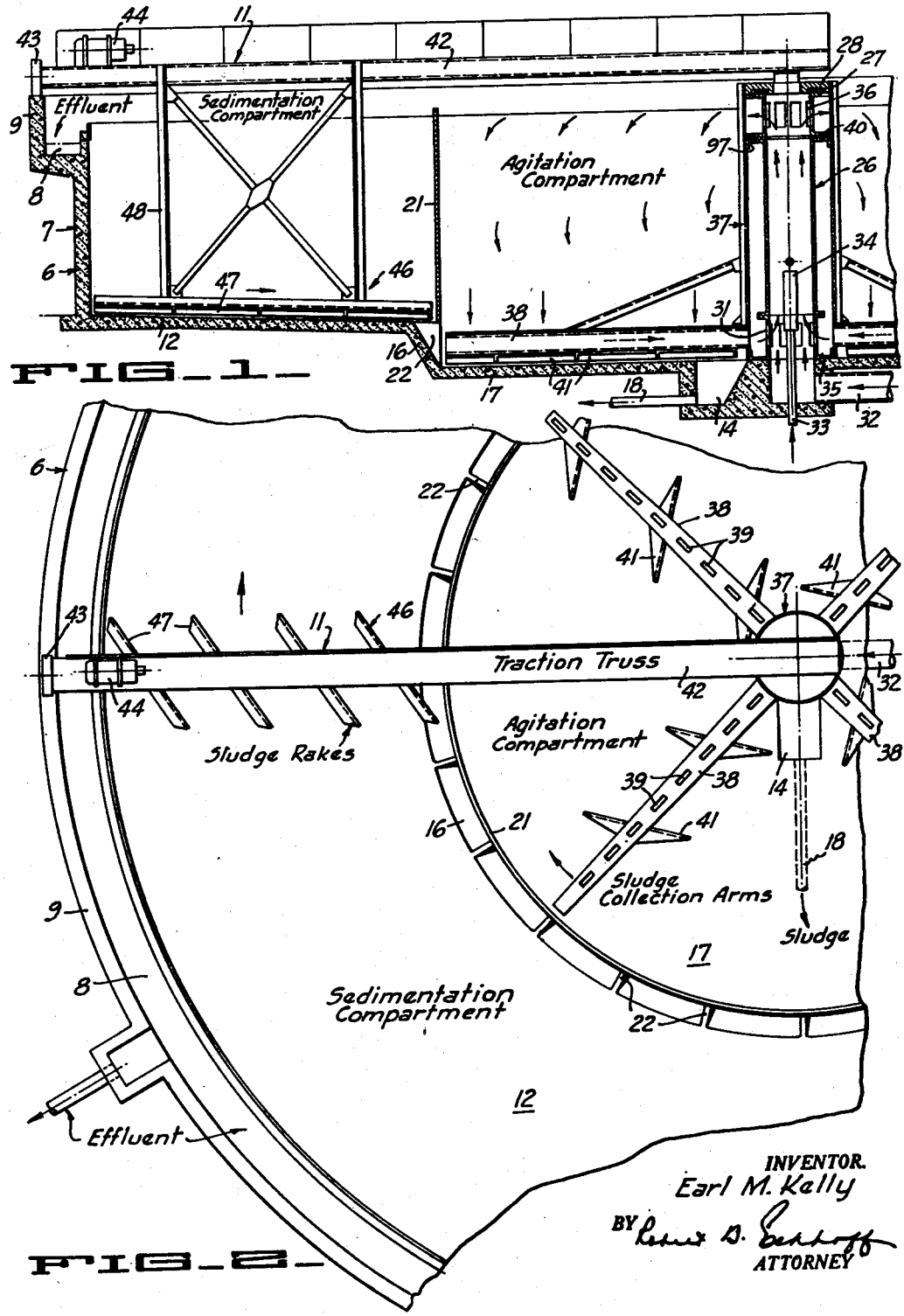

2,506,927

UNITED STATES PATENT OFFICE 2,506,927

CLARIFICATION

Earl M. Kelly, Los Angeles, Calif., assignor to Process Engineers Incorporated, San Francisco, Calif., a corporation of California Application February 16, 1946, Serial No. 648,111

4 Claims. (Cl. 210—8)

1

This invention relates to improvements in apparatus for separating solids from a liquid and particularly to improvements in that type of equipment generally designated as clarifiers.

If a liquid containing solids suspended therein, other than particles in true colloidal suspension, is held in a quiescent state for a sufficiently long period of time, the solids settle and the clear liquid can be drawn off. Such an operation requires a considerable period of time; when the volume of liquid to be handled in a given time period is relatively large, the size of the equipment required will be inordinately large. To the end that the size of the equipment can be reduced and the rate of settling increased, various schemes and proposals have been advanced. The present invention is concerned with an improved clarifier construction enabling the rate of settling to be increased materially. Briefly, the apparatus of the present invention includes a tank or vessel having, in the preferred form of the invention, three concentrically arranged compartments, an outer sedimentation compartment, an intermediate agitation compartment and a central treatment compartment into which (1) a portion of the liquid from the agitation compartment is admitted together with (2) fresh incoming liquid, the fresh liquid in the central treatment zone being mixed with that from the agitation compartment containing a larger concentration of solids.

In the case of liquids such as raw sewage having a biological oxygen demand (frequently abbreviated as B. O. D.), air is preferably admitted to the central compartment or treatment zone to assist in mixing and circulating the liquid therein, to freshen the sewage, reduce odors and scum and to satisfy the biological oxygen demand. In addition, the aeration of the fluid enables organic solids to be held in the tank for a period of far beyond that normally possible without encountering troublesome decomposition. The unit is also useful upon sedimentation of a final sewage effluent following some type of initial treatment for the aeration and further purification effected permits a large bed of aerobic sludge to be built up which further assists in purifying the incoming liquid.

In case aeration is either unnecessary or detrimental, the incoming liquid and that in the agitation zone are mixed by mechanical agitation in the absence of aeration to the end that the incoming liquid is thoroughly blended with the liquid containing solids in the agitation zone.

It is in general the broad object of the present invention to provide an improved and novel clarification device.

Another novel feature of the present invention is the inclusion of suitable sludge collection means in the agitation compartment to receive a sludge which separates out in that compartment and return this for re-introduction and mixing with the incoming fluid. In this way, maximum size particles are built up, these settling quite rapidly. This also enables an improved utilization to be made of any chemical added for treatment such as ferric chloride or other treatment agents. I have found that mixing of the separated sludge with the incoming effluent liquid containing additional solid particles results in an increase in the settling rate to the end that clarified liquid can be drawn off at a maximum rate for unit of vessel area or volume. Further, the repeated return of at least a sludge portion to the aeration zone results in an increase of the degree of aeration effected of the sludge so that an aerobic sludge is built up and maintained.

A further object of the present invention is to provide an improved classifier in which the sludge settling in the agitation compartment is returned to the incoming liquid stream for thorough mixing and selective aeration.

The invention includes other features and objects of advantage, some of which, together with the foregoing, appear hereinafter.

Referring to the drawings accompanying and forming a part hereof, Figure 1 is a side elevation, partly in section, through a preferred form of improved clarifier of this invention.

Figure 2 is a partial plan view of the clarifier shown in Figure 1.

Figure 3 is a side elevation partly in section showing a modified form of clarifier.

Figure 4 is a side elevation partly in section showing another modified form of clarifier.

Figures 5 and 6 are each side elevations partly in section illustrating modified constructions of the central or treatment compartment.

Referring particularly to Figures 1 and 2, I have shown a circular tank, indicated generally by numeral 6, having an outer vertical wall 7 carrying an effluent trough 8 and providing a circular trackway 9 for a traction truss structure generally indicated by numeral 11. The tank includes a bottom 12 which slopes inwardly over at least a portion of its extent to discharge solids collecting thereon onto a downwardly extending portion 16 discharging onto tank bottom section 17 which is immediately adjacent to sludge pocket 14. Solids collecting in the pocket 14 are removed through line 18 by drawing off a small stream of liquid.

The agitation compartment is defined by an annular baffle or wall 21 positioned about the outer periphery of bottom section 17 and supported in a spaced relation above that wall by a plurality of support members 22 so that there exists about the lower edge of wall 21 a plurality of openings through which effluent liquid can flow at a very low flow rate into the sedimentation compartment provided between wall 21 and wall 7 and sludge from bottom section 12 can flow downwardly onto bottom section 17.

Mounted centrally and supported on the tank is a central column structure, indicated generally by numeral 26 and having, at its upper end, a suitable bearing 27 provided as a support for a turntable support 28 for traction truss 11. The column 26 includes inlet ports 31 adjacent the lower portion of the column through which the sludge, collected from the agitation compartment, is admitted to mix with incoming fluid admitted through inlet 32.

An air inlet pipe 33 is positioned to discharge air into the central portion of the column through diffuser 34 so that the incoming liquid and the solids passing upwardly through the column are suitably aerated. The aerated mixture passes outwardly adjacent the upper portion of the column through ports 36 and into the agitation compartment.

A cage 37 is mounted upon the turntable and concentrically with respect to the column 26 to rotate with the turntable and move the several radial arms 38 over the bottom portion 17. The cage 37 is spaced from the column 26, the cage being suitably sealed at its lower end as at 35 while an apertured annular plate 40, positioned near the top of the column 26, provides additional support for the turntable and acts with brackets 97 as a seal for the space between the column and the cage. The arms 38 extend radially from the cage 37, preferably being tapered as they extend away from the cage. Each arm includes a plurality of apertures 39 on its upper face into which a fraction of the suspended solids which settle in the agitation compartment can pass and flow through the hollow arms and through ports 31. Each arm 38 includes several rakes 41 thereon to work the sludge which settles and collects on the bottom portion 17 of the agitation compartment toward and finally into sludge pocket 14.

The traction truss structure is well known in the art, comprising a beam 42 supported upon turntable 28 at one end and by wheel support 43 at the other end. The truss rotates upon track portion 9 on the outer wall 7, the wheel support being suitably driven as by the prime mover indicated at 44. Mounted upon the beam is a sludge rake structure 46 including a plurality of rakes 47 suitably supported by frame 48 at an angle to the periphery of the tank so that, upon rotation of the truss, the rakes work the sludge inwardly until the sludge discharges down over bottom section 16 into the agitation compartment and finally into sludge pocket 14.

In operation, on a fluid such as a raw sewage admitted to the treatment zone provided by column 36, the sewage is mixed with previously settled solids which are in an aerobic condition so that, upon mixing of the solids, the fresh fluid is aerated and the solids quickly become aerobic and any B. O. D. is satisfied.

In addition, the mixing operation effected in the central column between the fresh liquid and solids and the settled solids provide a zone of relatively high sludge concentration in the agitation compartment so that the sludge in the agitation compartment has a tendency to settle rapidly. What little sludge does pass out into the sedimentation compartment has a relatively rapid settling rate so that the rate of liquid flow through the clarifier is relatively high and so that the effluent liquid draining into trough 8 is clear and well aerated. If desired, a scum skimmer can be provided to remove any material which finds its way to the surface of the liquid.

As typical of an operation, I will describe one in which the outer tank 6 was 60 feet in diameter, the intermediate or agitation compartment was 20 feet in diameter, cage 37 was 4 feet in diameter while the central column was of 20 inch diameter. The tank was generally of a 10 foot depth. Four sludge collection arms were mounted upon the cage and the area of apertures 39 in each arm for the collection of solids was 115.2 square inches. The free area in the sedimentation compartment amounted to 2,513 square feet.

Operating with an average daily flow of 2,000,000 gallons per day, equivalent to an average of 1400 gallons per minute, 4200 gallons per minute were recirculated while 153 cubic feet of air were released per minute into the recirculating and influent liquid streams. The fluid was retained in the agitation compartment for an average of 17 minutes and for an average of 130 minutes in the sedimentation compartment, the discharge or overflow rate being at the rate of 630 gallons per square foot of tank per day.

The apparatus described can be modified in various ways without departing from the invention. For example, in Figure 3 I have shown a simplified construction in which tank 51 is provided, the tank having a wall 52 with an effluent trough 53 formed upon an upper portion of the wall. The tank includes a bottom 54 sloping inwardly toward its center and including a sludge discharge pocket 56 and an inlet line 57 for the discharge of liquid to be treated. One or more beams 58 are extended across the tank to provide a support for a bearing 59 on which center column 61 is mounted for rotation. An annular wall 72 is supported from the transverse beams 58 above the tank bottom by several brackets 73, the wall separating the sedimentation compartment and the agitation compartment.

The central column 61 includes a gear 62 at its upper end which rests upon the bearing 59, the gear being enmeshed with a gear 63 driven by a prime mover generally indicated by numeral 64. At its lower end, the column is fitted into a seal 60 in the inlet pipe 57. The central column includes inlet ports 66 at its lower end so that sludge from the agitation compartment can be admitted to the influent liquid to mix with the liquid as it rises through the column 61. A diffuser 67 is provided in the column being supplied with air through line 68 from an air blower 69. The aerated sludge-influent liquid issues from ports 71 adjacent the upper portion of the tank.

Mounted upon the central column for rotation with the column are a plurality of radial rakes 74, the rakes being supported upon the column at 76 and by braces 77. The rakes move the sludge toward the sludge pocket while that which is in suspension adjacent the ports 66 enters these to mix with the fresh liquid.

The structure shown in Figure 4 is much like that shown in Figures 1 and 2 except that the agitation compartment in Figure 4 is provided by a wall 81 supported by suitable braces 82 directly from the cage 37 while the bottom 84 of tank 83 slopes inwardly toward the central portion of the tank and a plurality of radial rake arms 86 are supported directly from cage 37 and are movable over the bottom of the tank upon rotation of the traction truss structure 11. In this modification, the air diffuser 87 is provided in the inlet line 32 so that an aerated liquid stream rises into the central column to mix with the sludge. That portion 88 of each rake arm which lies within and beneath the confines of wall 81 are hollow and have ports therein (as with the arms 38 shown in Figures 1 and 2) to receive sludge and feed it into the fresh liquid.

Referring to Figure 5 I have shown a modified construction in which the central column is closed by a plate 91 adjacent the top of the column and a gas exhaust line 92 is connected to the interior of the column so that effluent odorous gases can be drawn off. Outlet parts 93 leading from the interior of the column are preferably positioned below the liquid level indicated by line 95 so that thorough mixing of the liquid takes place and any gas released is collected in the upper portion of the column beneath plate 91. To facilitate this, the column includes apertured plate member 40 engaging brackets 97 to seal the space between the column and the cage. Outlet ports 98 are provided in the cage to release the liquid from the column.

Referring to Figure 6, I have shown an electric motor 101 mounted upon the traction truss beam 102, the motor having a suitable shaft 103 depending therefrom and supported in several bearings indicated at 104 in casing 106. At its lower end, casing 106 is supported by brackets 107 from the central column 26. At the lower end of shaft 103 is positioned a suitable impeller 108. The motor is preferably reversible so that periodically it can be reversed and the direction of sludge circulation altered as the sludge is circulated through ports 111 and 112.

I claim:

1. In clarification apparatus comprising a tank adapted to contain a pool of liquid to be clarified, a sediment discharge means in the bottom of the tank near its center, a liquid discharge means at its upper periphery and a rake structure extending just above the bottom from the sediment discharge means to the periphery of the tank and rotatable about a substantially central axis so as to rake sediment from the tank bottom into the discharge means, the combination which comprises an annular baffle disposed in the tank and extending from a level just above the rake structure to a level above the upper level of the pool and dividing the tank into an inner region and an outer annular region both open at the bottom to communicate with the region in which the rake structure moves, air-actuated circulating means disposed in the inner region above the sediment discharge means to induce return of settled solids from the lower portion to the upper portion of the inner region and simultaneously aerate the material being returned, and means for introducing liquid to be clarified into the inner region.

2. In clarification apparatus comprising a tank adapted to contain a pool of liquid to be clarified, a sediment discharge means in the bottom of the tank near its center, a liquid discharge means at its upper periphery and a rake structure extending just above the bottom from the sediment discharge means to the periphery of the tank and rotatable about a substantially central axis so as to rake sediment from the tank bottom into the discharge means, the combination which comprises an annular baffle disposed in the tank and extending from a level just above the rake structure to a level above the upper level of the pool and dividing the tank into an inner region and an outer annular region both open at the bottom to communicate with the region in which the rake structure moves, an upright airlift disposed in the inner region near its center and provided with an opening communicating directly with a lower portion of the region to induce circulation between the lower and upper portions and carry sediment to the upper region, and means for introducing feed liquid to be clarified into the inner region.

3. In clarification apparatus comprising a tank adapted to contain a pool of liquid to be clarified, a sediment discharge means in the bottom of the tank near its center, a liquid discharge means at its upper periphery and a rake arm extending just above the bottom from the sediment discharge means to the periphery of the tank and rotatable about a substantially central axis so as to rake sediment from the tank bottom into the discharge means, the combination which comprises an annular baffle disposed in the tank and extending from a level just above the rake arm to a level above the upper level of the pool and dividing the tank into an inner region and an outer annular region both open at the bottom to communicate with the region in which the rake arm moves, an airlift comprising substantially central upright hollow column with lower ports near the sediment discharge means and communicating directly with the inner region and with upper ports adjacent the upper level of the pool disposed in the inner region to induce circulation of settled material between the lower and upper portions thereof, and means for introducing liquid to be clarified into the inner region.

4. In sewage clarification apparatus comprising a tank adapted to contain a pool of sewage to be clarified, a sludge discharge means in the bottom of the tank near its center, a liquid discharge means at its upper periphery and a rake arm extending just above the bottom from the sediment discharge means to the periphery of the tank and rotatable about a substantially central axis so as to rake sediment from the tank bottom into the discharge means, the combination which comprises an annular baffle disposed in the tank and extending from a level just above the rake arm to a level above the upper level of the pool and dividing the tank into an inner region and an outer annular region both open at the bottom to communicate with the region in which the rake arm moves, an upright airlift column disposed in the inner region and communicating directly with a lower portion of the inner region and communicating directly with an upper portion of the inner region to induce circulation of settled sludge between the upper and lower portions thereof, and means for introducing sewage feed to be clarified into the lower portion of the airlift column.

EARL M. KELLY.

REFERENCES CITED

The following references are of record in the file of this patent:

UNITED STATES PATENTS

| Number | Name | Date |
| --- | --- | --- |
| 2,223,257 | Mallory | Nov. 26, 1940 |
| 2,223,258 | Mallory | Nov. 26, 1940 |
| 2,233,792 | Mallory | Mar. 4, 1941 |
| 2,245,587 | Hughes | June 17, 1941 |
| 2,291,772 | Talbot et al. | Aug. 4, 1942 |
| 2,348,123 | Green et al. | May 2, 1944 |
| 2,355,069 | Green | Aug. 8, 1944 |
| 2,391,738 | Prager | Dec. 25, 1945 |
| 2,411,390 | Prager | Nov. 19, 1946 |
| 2,419,004 | Bieker et al. | Apr. 15, 1947 |
| 2,429,316 | Green | Oct. 21, 1947 |
| 2,492,486 | Kivari et al. | Dec. 27, 1949 |